(12) United States Patent
Martin et al.

(10) Patent No.: US 12,441,628 B2
(45) Date of Patent: Oct. 14, 2025

(54) SYSTEMS AND METHODS FOR AUTOMATED SAMPLING, TESTING AND TREATING LARGE WATER BASINS

(71) Applicant: AQUATIC DESIGN & ENGINEERING, INC., Orlando, FL (US)

(72) Inventors: Joshua Matthew Martin, Orlando, FL (US); Kenneth Ray Martin, Orlando, FL (US)

(73) Assignee: AQUATIC DESIGN & ENGINEERING, INC., Orlando, FL (US)

(*) Notice: Subject to any disclaimer, the term of this patent is extended or adjusted under 35 U.S.C. 154(b) by 802 days.

(21) Appl. No.: 17/741,552

(22) Filed: May 11, 2022

(65) Prior Publication Data
US 2022/0363564 A1 Nov. 17, 2022

Related U.S. Application Data

(60) Provisional application No. 63/188,069, filed on May 13, 2021.

(51) Int. Cl.
*C02F 1/00* (2023.01)
*C02F 1/50* (2023.01)
(Continued)

(52) U.S. Cl.
CPC .......... *C02F 1/006* (2013.01); *C02F 1/004* (2013.01); *C02F 1/50* (2013.01); *G01N 1/14* (2013.01); *C02F 2103/42* (2013.01); *C02F 2209/006* (2013.01); *C02F 2303/04* (2013.01); *C02F 2307/14* (2013.01)

(58) Field of Classification Search
CPC .. C02F 1/006; C02F 1/004; C02F 1/50; C02F 2103/42; C02F 2209/006; C02F 2303/04; C02F 2307/14; G01N 1/14
See application file for complete search history.

(56) References Cited

U.S. PATENT DOCUMENTS 4,966,717 A * 10/1990 Kern ...................... E04H 4/1645
 210/167.11
4,995,123 A * 2/1991 Kern .......................... C02F 1/78
 137/563

(Continued)

FOREIGN PATENT DOCUMENTS

EP 1820780 A1 * 8/2007 .............. C02F 1/006

*Primary Examiner* — Benjamin L Lebron

(57) ABSTRACT

Embodiments of the invention provide a method, system and computer program product for automated sampling, testing and treating large water basins. In an embodiment of the invention, the method includes storing a plurality of locations of a water basin, where each location includes at least one chemical delivery outlet. The method further includes monitoring water quality for each of the plurality of locations and mapping a water quality value to each of the locations. The method even further includes responsive to the water quality value failing to meet a threshold value in one of the locations, automatically determining an amount of chemical based on the water quality value and delivering the amount of chemical only to the one of the locations through its corresponding chemical delivery outlet.

20 Claims, 9 Drawing Sheets

(51) Int. Cl.
*C02F 103/42* (2006.01)
*G01N 1/14* (2006.01)

(56) References Cited

U.S. PATENT DOCUMENTS

| | | | |
|---|---|---|---|
| 9,034,193 B2* | 5/2015 | Shalon | B65D 83/0409 210/739 |
| 2009/0200245 A1* | 8/2009 | Steinbrueck | G05D 21/02 700/282 |
| 2014/0166588 A1 | 6/2014 | Fischmann | |
| 2016/0061796 A1* | 3/2016 | Miller | G01N 7/00 73/19.1 |
| 2017/0191237 A1 | 7/2017 | Fishmann Torres | |
| 2020/0148552 A1 | 5/2020 | Yizhack et al. | |

* cited by examiner

SYSTEMS AND METHODS FOR AUTOMATED SAMPLING, TESTING AND TREATING LARGE WATER BASINS

CROSS-REFERENCE TO RELATED APPLICATION

This application claims priority to U.S. Provisional Patent Application 63/188,069 filed on May 13, 2021, the entirety of which is incorporated herein by reference.

FIELD OF THE INVENTION

The present invention relates to systems and methods for sampling, testing and treating large water basins and more particularly to automated systems and methods for sampling, testing and treating large water basins.

DESCRIPTION OF THE RELATED ART

Pools require constant maintenance. The water of a pool must be filtered through a filtration system at least every six (6) hours in order to meet municipal requirements. Chemical treatment must be consistently added to the pool to kill bacteria, break down organic particles, and inhibit algae growth. Larger debris must be skimmed out of the pool before the large debris accumulates. However, the constant pool maintenance allows one to enjoy the pool without suffering from harmful microorganisms that can cause health issues, such as gastroenteritis, Legionnaires disease, ear infections and athlete's foot.

For large water basins or pools, conventional pool filtration does not work as certain areas of the water basin may be more than a thousand feet from the filtration system and remain unfiltered. Rather, large water basins are usually plumbed to a larger body of water, such as a lake or ocean, and the water flows back and forth between the large water basin and the larger body of water. The flow between the two bodies of water ensures that new water enters the large water basin and the water does not remain stagnant. Further, other solutions to these problems require a flocculant or coagulant that is added to the water of the large water basin to aggregate the smaller particles that remain floating on the surface together, which causes the aggregated particles to sink to the bottom for vacuuming. Due to the requirements of larger body of water, additional chemical requirements in the form of flocculants and the additional labor or power requirements to vacuum the aggregated particles, there are significant additional cost, time and location constraints for the conventional design and maintenance of large water basins.

BRIEF SUMMARY OF THE INVENTION

Embodiments of the present invention address deficiencies of the art in respect to sampling, testing and treating large water basins and provide a novel and non-obvious method, system and computer program product for automated sampling, testing and treating large water basins. In an embodiment of the invention, a method for automated sampling, testing and treating large water includes storing a plurality of locations of a water basin, where each location includes at least one chemical delivery outlet. The method further includes monitoring water quality for each of the plurality of locations and mapping a water quality value to each of the locations. The method even further includes responsive to the water quality value failing to meet a threshold value in one of the locations, automatically determining an amount of chemical based on the water quality value and delivering the amount of chemical only to the one of the locations through its corresponding chemical delivery outlet.

In one aspect of the embodiment, each location includes a chemical controller in communication with a chemical delivery pump that is in fluid communication with its corresponding at least one chemical delivery outlet and each chemical controller only delivers the amount of chemical to its corresponding location through the chemical delivery pump. In another aspect of the embodiment, each location includes at least one sensor for monitoring water quality, there is a chemical controller that is in communication with a chemical delivery pump that is in fluid communication with the chemical delivery outlets of the plurality of locations and the chemical controller is capable of delivering the amount of chemical to each of the plurality of locations separately through the chemical delivery pump. In another aspect of the embodiment, each location includes at least one valve in fluid communication with a sampling pump and the water quality for each location is monitored by drawing water through its corresponding valve by the sampling pump for testing, there is a chemical controller that is in communication with a chemical delivery pump that is in fluid communication with the chemical delivery outlets of the plurality of locations and the chemical controller is capable of delivering the amount of chemical to each of the plurality of locations separately through the chemical delivery pump. In yet another aspect of the embodiment, the method further includes monitoring fluid flow within the water basin for each of the plurality of locations through a flow sensor in each of the plurality of locations, each location further comprises at least one inlet and at least one outlet and a filter pump between the inlet and outlet and responsive to the water quality failing to meet the threshold value in the one of the locations, increasing the fluid flow only to the one of the locations through its corresponding filter pump to provide additional filtration to the one of the locations. In even yet another aspect of the embodiment, the method further includes automatically determining an additional amount of chemical based on the water quality value and further delivering the additional amount of chemical to at least one other of the plurality of locations adjacent to the one of the locations through the other location's corresponding chemical delivery outlet.

In another embodiment of the invention, a data processing system may be configured for automated sampling, testing and treating large water basins. The system includes a host computing system including one or more computers each with memory and at least one processor and an application executing in memory of the host computing system. An automated sampling, testing and treating larger water basin module is coupled to the application and the module includes program code enabled to store a plurality of locations of a water basin, where each location includes at least one chemical delivery outlet. The module further includes program code enabled to monitor water quality for each of the plurality of locations and mapping a water quality value to each of the locations. The module further includes program code enabled to respond to the water quality value failing to meet a threshold value in one of the locations by automatically determining an amount of chemical based on the water quality value and the amount of chemical only to the one of the locations through its corresponding chemical delivery outlet.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
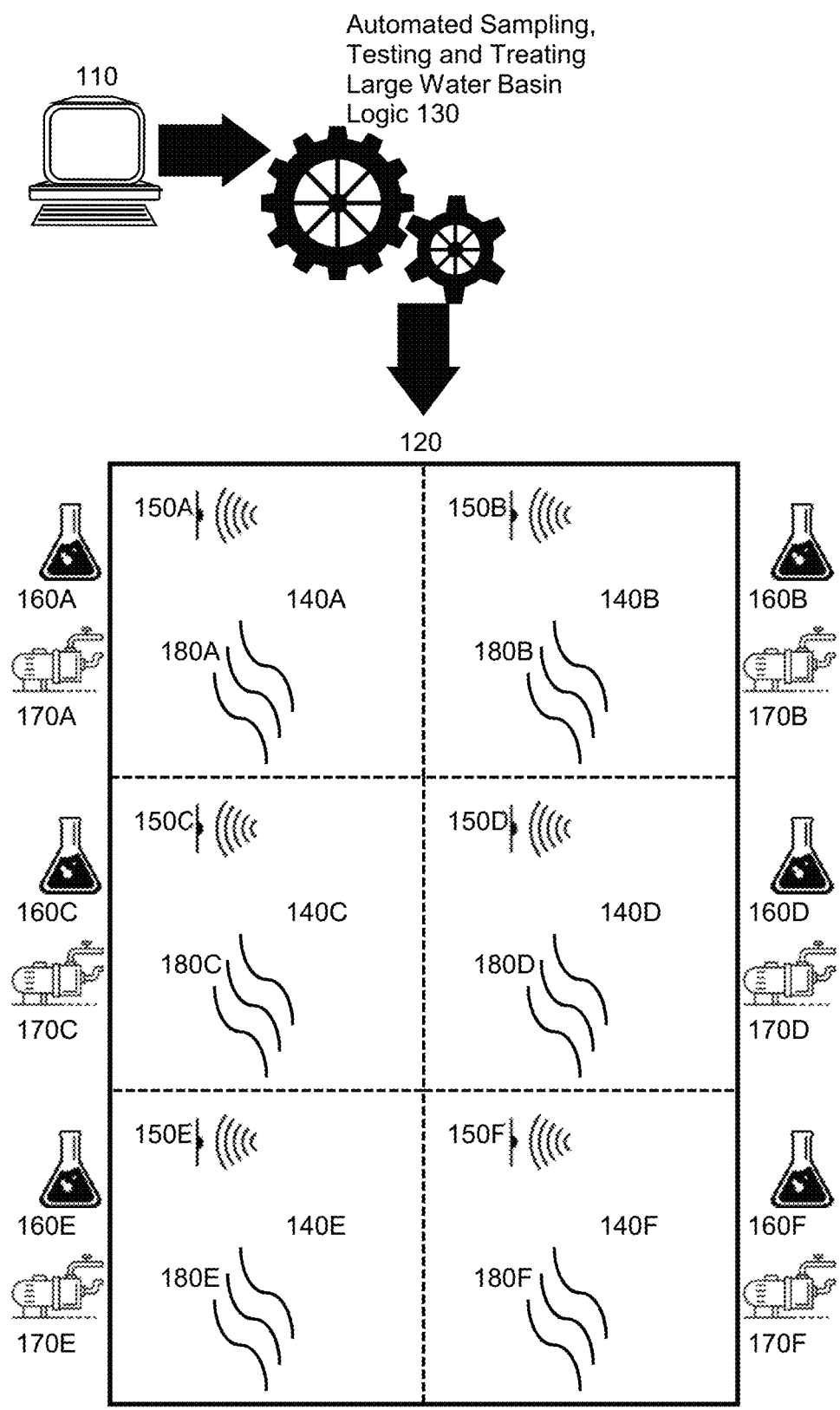
FIG. 1 is a pictorial illustration of a process for automated sampling, testing and treating large water basins.

Embodiments of the invention provide for automated sampling, testing and treating large water basins through mechanisms to test and deliver an appropriate amount of chemicals to appropriate locations within the large water basin in real-time based upon real-time analysis of programmatic water sampling. The large water basin includes multiple locations or zones (zones and location are used interchangeably) within the large water basin and each of the locations may include a sensor or sensors for sampling and testing the water quality in that particular location and sensors for detecting fluid flow in the particular location. The sensors may detect water quality for each of the locations. Alternatively, or in addition to the sensors, each of the locations may include a valve in fluid communication with a sampling pump that draws water from each of the locations to test and detect the water quality in each of the locations. The water quality may include turbidity, total hardness, total chlorine, free available chlorine, pH, total alkalinity and total dissolved solids or may be able to detect particular contaminants as well, or any water quality value, or any combination thereof.

Each location of the large water basin also includes a chemical delivery outlet or outlets from a chemical delivery system, where chemical may pumped through piping to each of the locations of the water basin from a central hub or hubs of the chemical delivery system where the chemicals are delivered from. Alternatively, each location of the large water basin may include its own chemical delivery system or chemical controller to deliver the chemicals to the corresponding location through a chemical delivery pump. If the water quality value fails to meet a required threshold value for water quality standards in one of the locations, chemicals can be automatically delivered to that location. The chemicals may include chlorine-type pool chemicals that are used to disinfect pools by disinfecting or neutralizing or killing various contaminants such as algae, bacteria, ammonia, nitrogen-containing contaminants and organic contaminants. The chemicals may include chlorine gas, sodium hypochlorite, calcium hypochlorite, lithium hypochlorite or chlorinated isocyanurates, bromine, ozone, hypobromic acid, or any compounds that releases hypochlorous acid (HOCl), as well as a stabilizer, such as chlorinated isocyanurates that release cyanuric acid, or any chemical that is used to treat pools, or any combination thereof.

Further, the large water basin includes a water filtration system with inlets and outlets throughout each of the locations of the large water basin. The water filtration may pump water from the outlets or inlets located in the large water basin into the filtration system through pumps and filters at a central hub or hubs and then subsequently pumps the filtered water back into the large water basin through its inlets or outlets. Alternatively, each location of the large water basin may include its own water filtration system with their own pumps and filters. Fluid flow in each location may be monitored through flow sensors. The inlets and outlets may be positioned in specific locations of the large water basin in order to cause a desired fluid flow so that larger objects, such as leaves and other items that fall into the large water basin may be collected in a desired location. As well, the amount of water flowing through the inlets and outlets may be adjusted to increase or decrease the amount of water flowing in specific locations. In this way, additional filtration may be provided by increasing the water flowing through the filtration system at specific locations. Thus, if a significant number of people are only in one portion of a large water basin, that may be multiple acres in size, additional chemicals, filtration or fluid flow may be provided in that specific location in real-time, without the need for human intervention and without having to adjust the chemicals, filtration or fluid flow in other locations of the large water basin via the automated controller.

In further illustration, FIG. 1 pictorially shows a process for automated sampling, testing and treating large water basins. As shown in FIG. 1, an end user may operate computing system 110 with automated sampling, testing and treating large water basin logic 130, which samples, tests and treats the large water basin or pool 120 by controlling its various components. The components of the large water basin 120 may include sensors for monitoring water quality 150A-F which samples and tests the water of the large water basin and flow sensors for monitoring fluid flow, chemical delivery outlets 160A-F which are connected or plumbed to a chemical delivery system or systems through pipes and pumps to deliver chemicals to the large water basin, filter inlets and outlets 170A-F, which are connected or plumbed to a filtration system or systems through pipes and pumps to filter the water of the large water basin. The filter inlets and outlets 170A-F may cause a current or fluid flow 180A-F in a desired manner, so that debris may accumulate in a specific area for ease of maintenance and cleaning of the large water basin.

Notably, large water basin 120 is divided into locations or zones 140A-F. Each location 140A-F may have its own sensor(s) 150A-F, chemical delivery outlet(s) 160A-F, filter inlet(s), and outlet(s) 170A-F. Although six (6) locations are shown, any amount of locations may be utilized. Further, the large water basin may be of any shape and size and thus the locations may be any shape and size. The amount and shape of locations will be dependent on the size and shape of the large water basin. In a preferred embodiment, the locations should include a large enough filtration system and filter inlets and outlets 170A-F to filter all of the water in the large water basin 120 within 6 hours.

Logic 130 monitors each of the locations through sensors 150A-F for water quality and maps the water quality values to each of the locations 140A-F. If logic 130 determines that the water quality fails to meet a threshold value in a location or locations 140A-F, logic 130 automatically implements measures to treat the water quality in real-time. The measures may include increasing the chemicals to the specific location or locations that failed to meet the threshold water quality value or increasing filtration and fluid flow 180A-F through filter inlets and outlets 170A-F in that location or locations. Logic 130 may determine the amount of chemicals required to treat the location based on the water quality value of that location and instruct the automatic delivery of the required amount of chemicals through the corresponding chemical delivery outlet 160A-F in real-time. Logic 130 may determine the amount of additional filtration required for a specific location based on the water quality value of that location and instruct the automatic increase in water filtration through corresponding filter inlets and outlets 170A-F in real-time for the specific location or locations. Logic 130 may also implement the embodiments shown in FIGS. 4 through 9.

Prior to the construction of the large water basin 120, logic 130 may determine the optimal amount of locations or zones 140A-F, as well as specific placement of the various components of the large water basin 120 by simulating fluid flow 180A-F after inputting the design plans of the large water basin 120 into logic 130 in the designing and planning stage to optimize the chemical treatment and filtration of large water basin 120.

Figure 2:
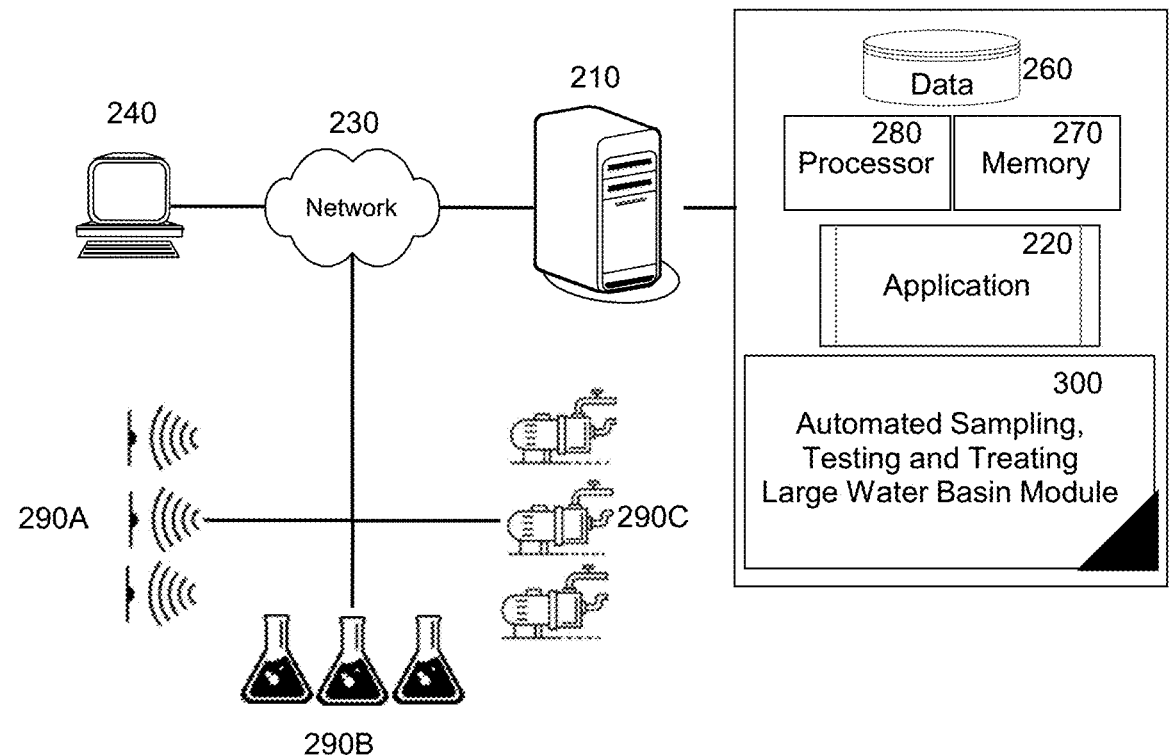
FIG. 2 is a schematic illustration of a data processing system adapted for automated sampling, testing and treating large water basins.

The process shown in FIG. 1 and the embodiments shown in FIGS. 4 through 9 may be implemented in a computer data processing system. In further illustration, FIG. 2 schematically shows a data processing system adapted for automated sampling, testing and treating large water basins. The system may communicate over a network 230 with a server 210 and the system may include at least one processor 280 and memory 270 and fixed storage 260 disposed within the system. In alternative embodiments, features of the system may be integrated into a single control panel. The system includes an application 220 with an automated sampling, testing and treating water basin module 300. The system is in communication with sensors for monitoring water quality 290A in locations of a large water basin or pool, chemical delivery system 290B with chemical delivery outlets in locations of the large water basin, and filtration system 290C with filter inlets and outlets in locations of the large water basin.

Importantly, the automated sampling, testing and treating large water basins module 300 may be coupled to the application 220. The module 300 monitors water quality through sensors 290A and maps water quality values to the specific locations of the large water basin. If water quality fails to meet a threshold value in a specific location, module 300 automatically determines the location that requires chemicals, the amount chemicals required based on the water quality value in the location, and instructs chemical delivery system to deliver the required amount of chemicals to the specific location in real-time. Further, module 300 may instruct the filtration system to increase the amount of filtration and fluid flow in the location to provide additional filtration and fluid flow to the water in that location in real-time.

Figure 3:
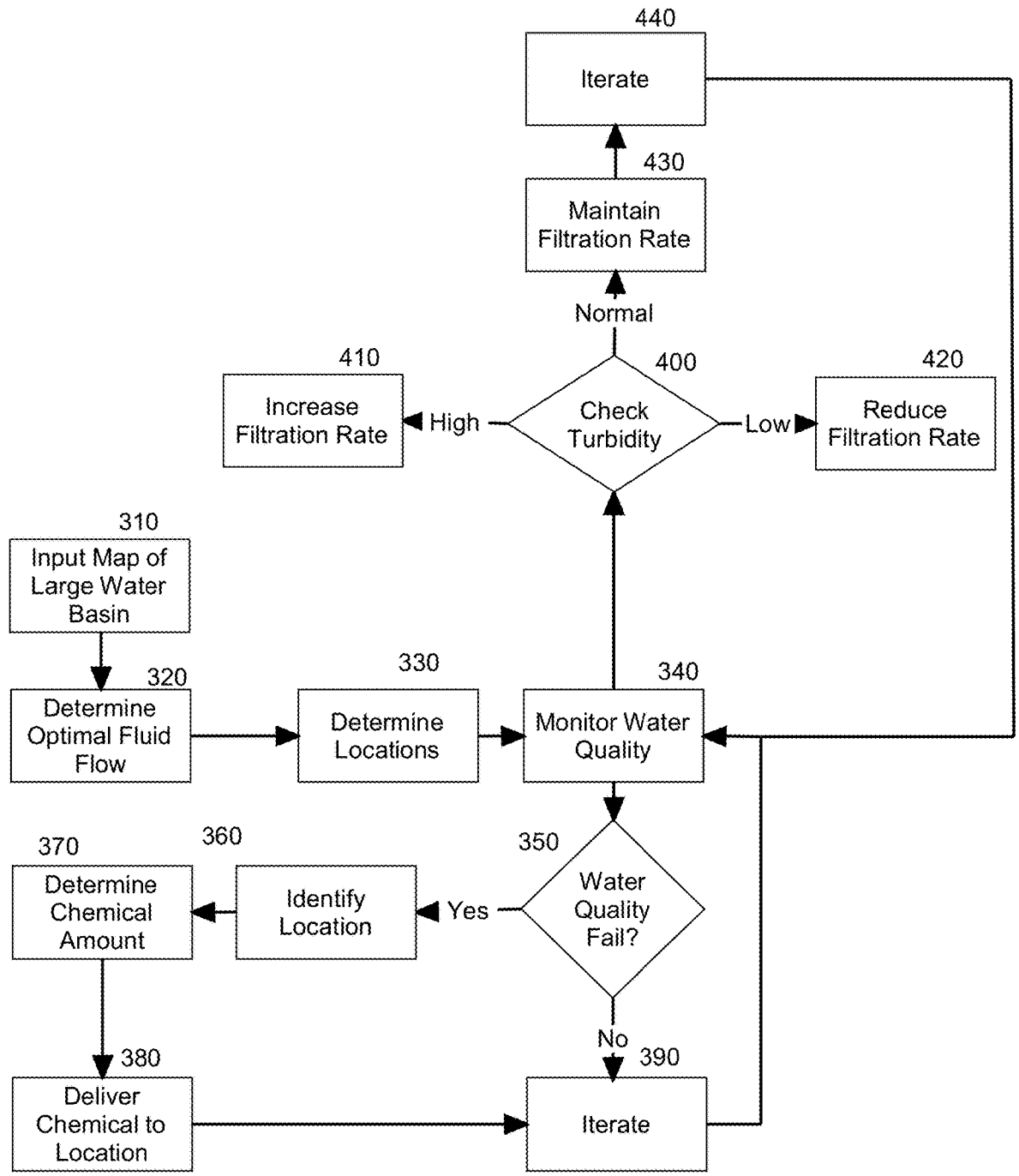
FIG. 3 is a flow chart illustrating a process for automated sampling, testing and treating large water basins.

In even yet further illustration of the operation of the module 300, FIG. 3 is a flow chart illustrating an exemplary process for automated sampling, testing and treating large water basins. Beginning in block 310, design plans of the large water basin are input into the system and, in block 320, the optimal fluid flow for filtration, chemical treatment and for debris to accumulate in desired areas for ease of cleaning is determined. In block 330, the optimal amount of locations or zones of the large water basin are determined and the associated placements of sensors for monitoring water quality, filter inlets and outlets for an automated plumbed filtration system, and chemical outlets for an automated plumbed chemical delivery system in each of the locations.

After all of the components are in place, in block 340, the water quality is automatically monitored as the sensors automatically sample and test the water in each of the locations of the large water basin and communicate the results of the tests to the system. In block 350, if the water quality meets the water quality standards, the monitoring continues until the water quality fails to meet the water quality threshold requirement. When the water quality fails the water quality threshold requirement, in block 360, the location is identified and the amount of chemicals required for treatment is determined in block 370 based on the water quality values communicated by the sensor(s). In block 380, the required amount of chemicals are delivered to the specific location that failed the water quality threshold or may also be delivered to adjacent locations to the specific location. In block 390, the process of monitoring and delivering chemicals to the specific locations of the large water basin that fail to meet the water quality requirements is iterated.

Figure 4:
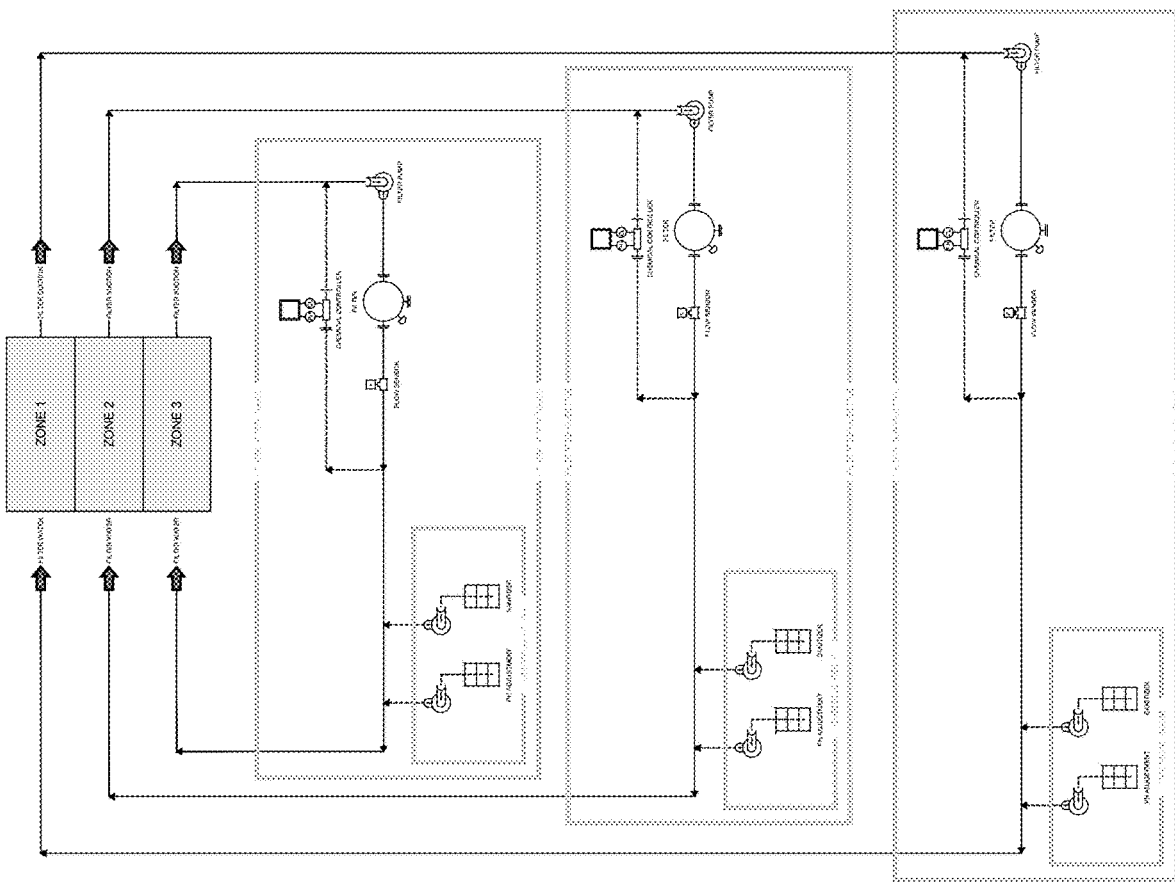
FIGS. 4 through 6 are exemplary schematic illustrations of large water basins adapted for automated sampling, testing and treating large water basins according to embodiments of the invention; and, FIGS. 7 through 9 are exemplary electrical schematic illustrations of large water basins adapted for automated sampling, testing and treating large water basins according to the embodiments of the invention of FIGS. 4 through 6, respectively.
Figure 5:
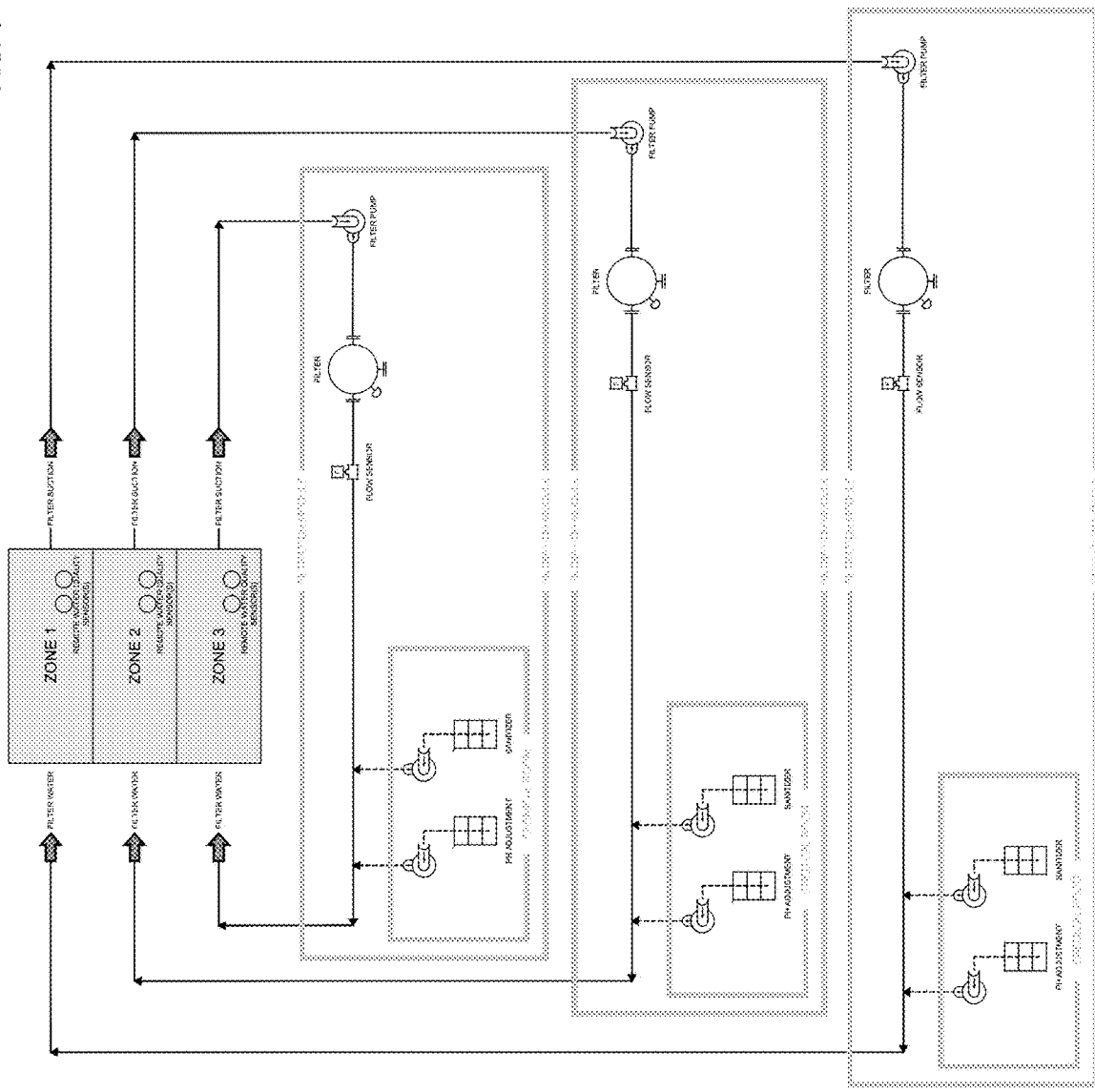
Figure 6:
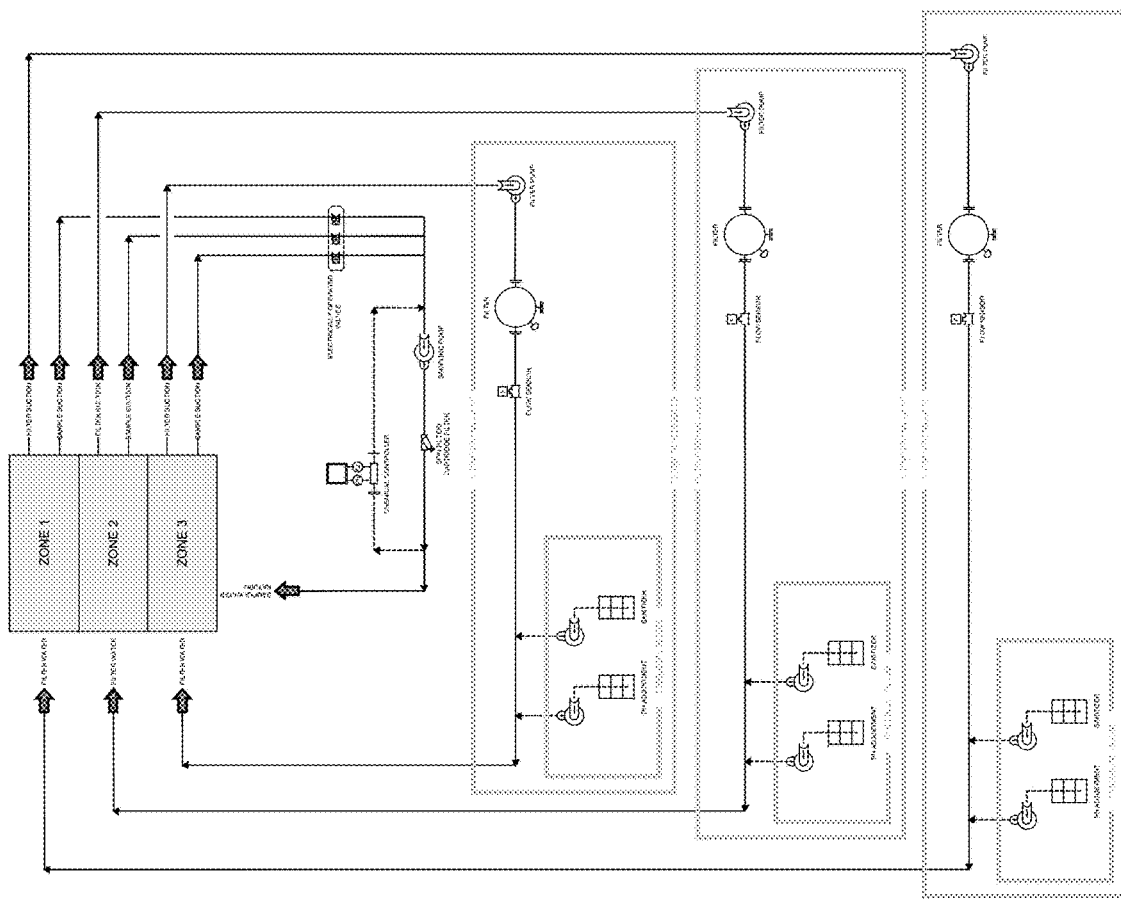
Figure 7:
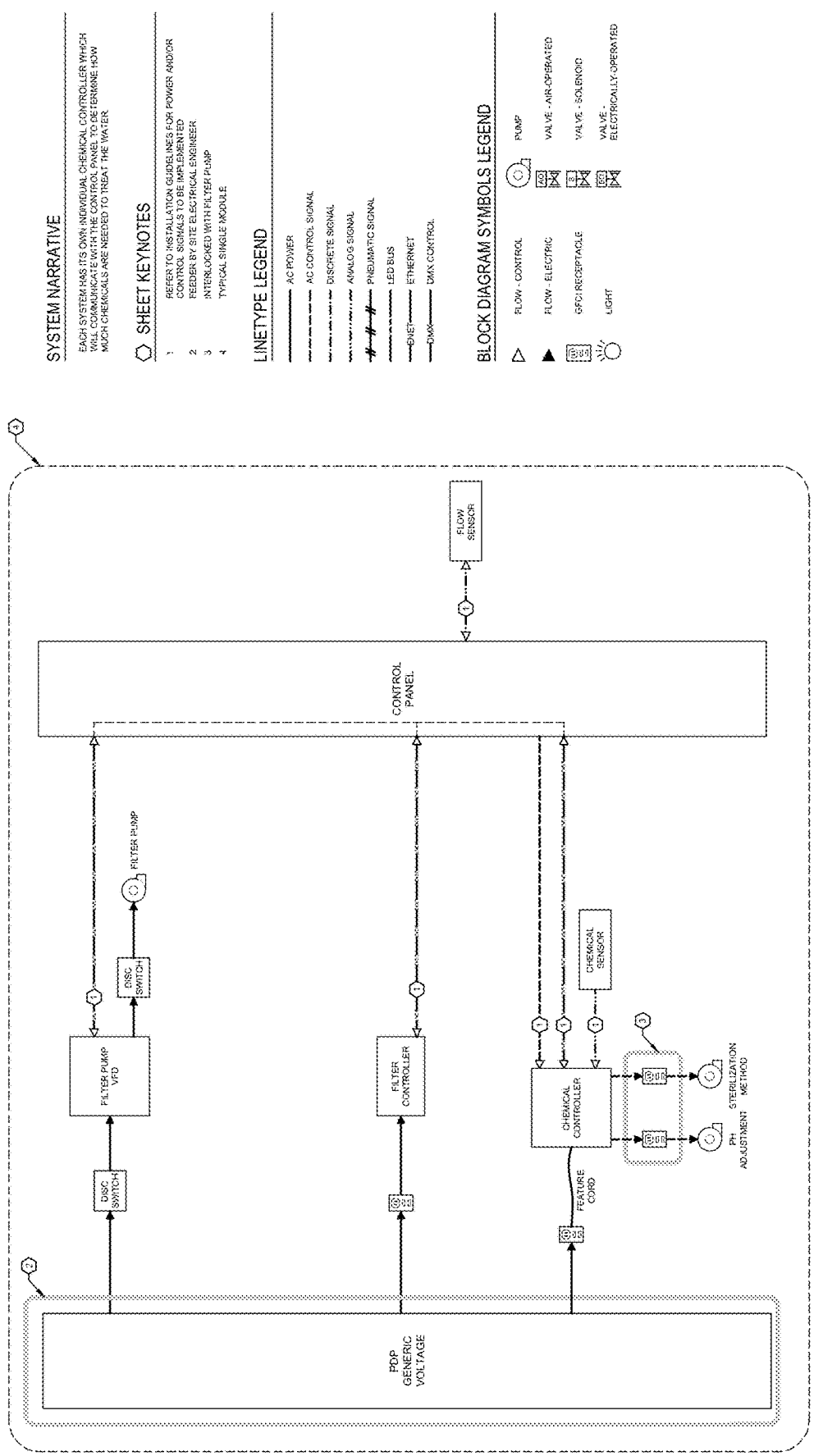
Figure 8:
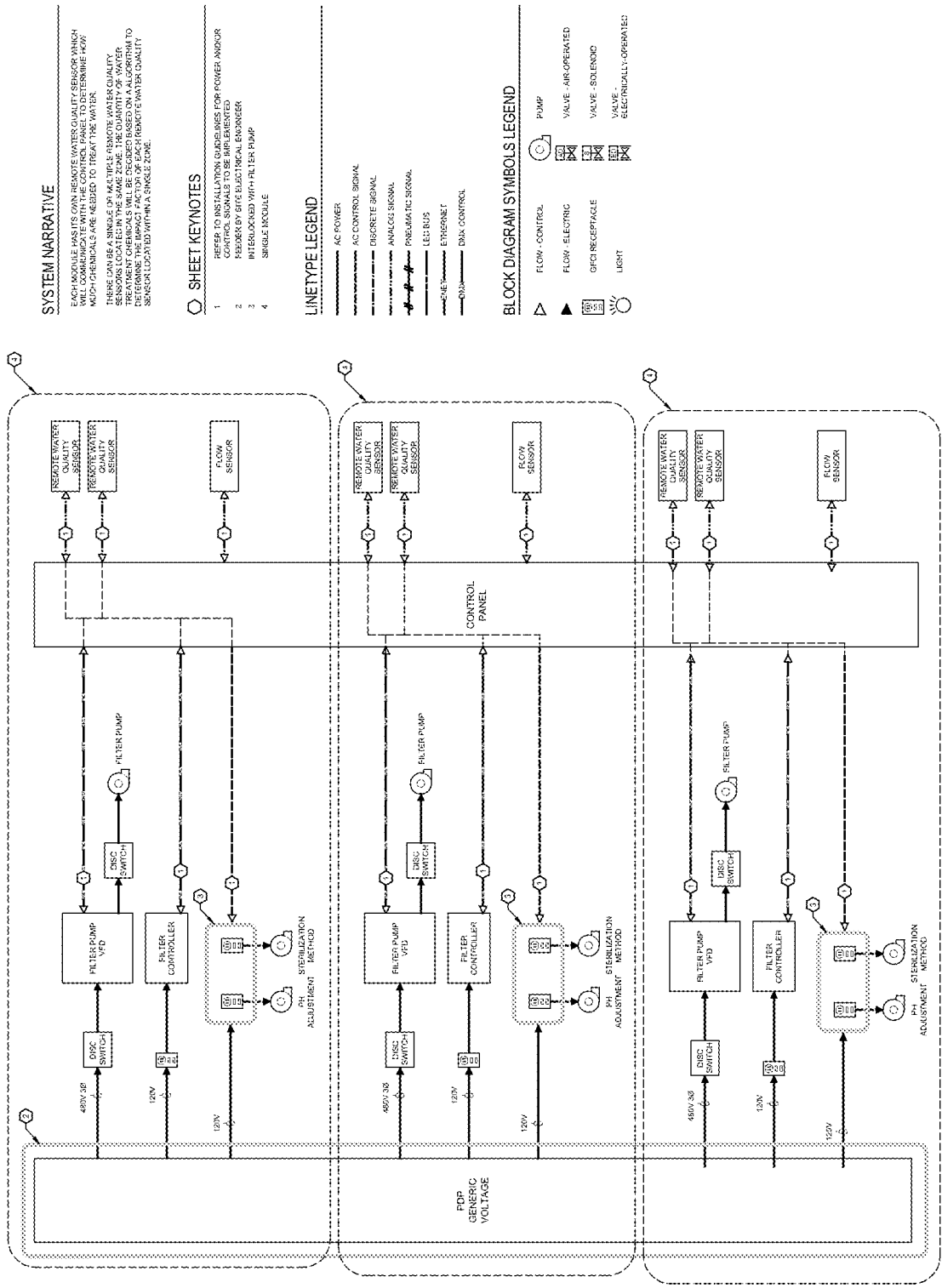
Figure 9:
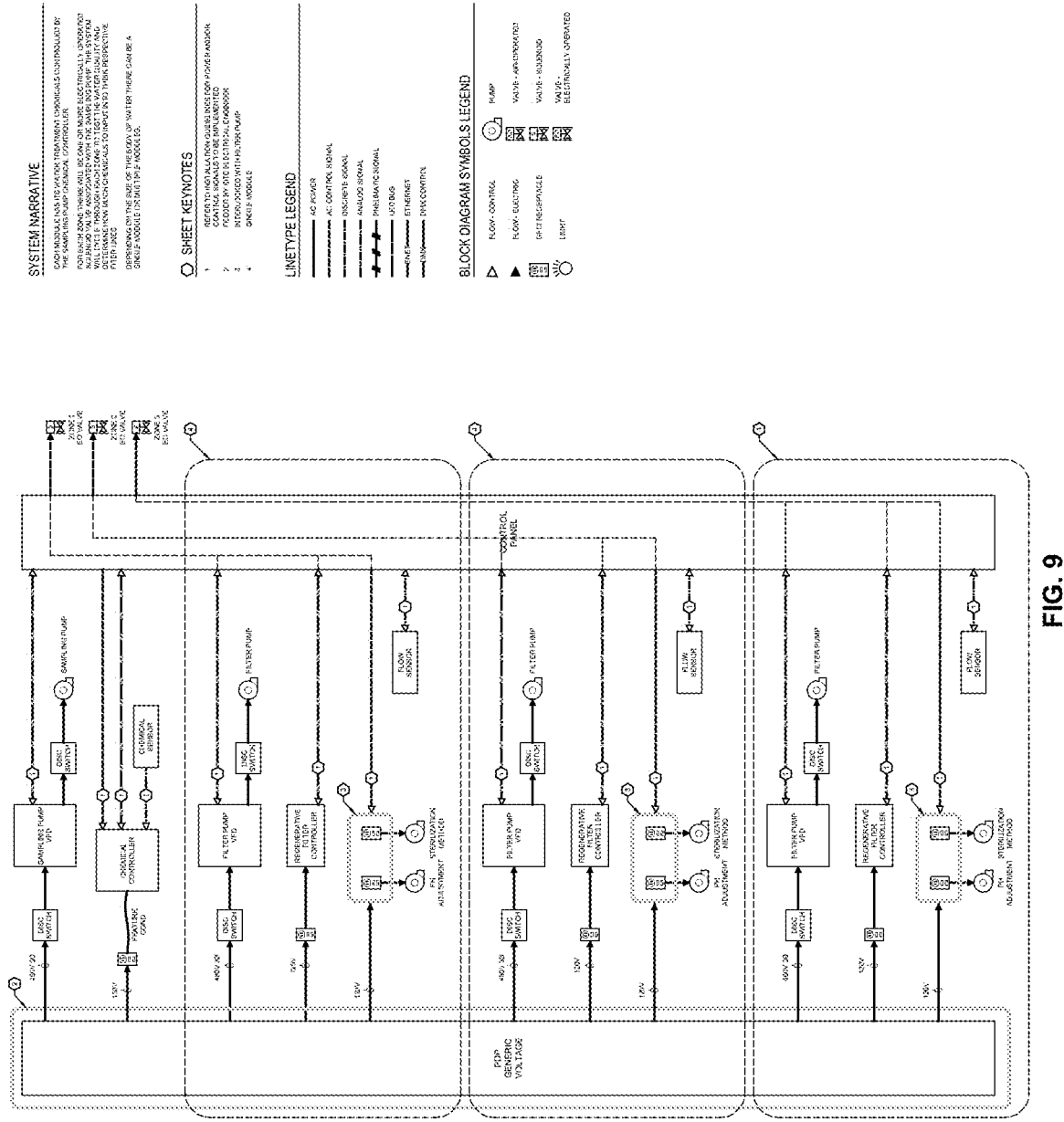

The automatic water quality monitoring of block 340 may also include turbidity level monitoring to determine the amount of filtration required in the specific location or locations adjacent to the specific location. In block 400, the water is automatically sampled and tested for turbidity levels. If the turbidity levels are high, in block 410, the filtration rate of that specific location or locations adjacent to that specific location is increased. If the turbidity levels are low, in block 420, the filtration rate of that specific location or locations adjacent to that specific location is reduced. If the turbidity levels are normal, in block 430, the filtration rate is maintained. In block 440, the process of monitoring and providing filtration to the specific locations of the large water basin that fail to meet the water quality requirements is iterated FIGS. 4 through 6 are exemplary schematic illustrations of large water basins adapted for automated sampling, testing and treating large water basins according to embodiments of the invention. FIGS. 7 through 9 are exemplary electrical schematic illustrations according to the embodiments of the invention of FIGS. 4 through 6, respectively As shown in FIGS. 4 through 9, the body of water may be divided into two or more zones depending on the volume of water. Although three zones are shown, any amount of zones are within the scope of this invention. Further, the filtration module is representative of a single filtration system or may be multiple filtration systems. Each zone may have its own filtration module to control the water quality of its respective zone. However, the filtrations system are not necessarily representative of individual rooms. The modules can be placed in a single room or separated as needed. Each filtration system may be able to test, filter, sterilize and adjust the chemistry of the water to ensure water quality. The filter pumps may have variable speed control and the chemical feed pumps have on-off control. The settings of the filter pumps and chemical feed pumps vary based on the chemical reading from the zone that they serve and adjacent zones.

With respect to FIGS. 4 and 7, each system has its own individual chemical controller that may include its own chemical delivery pump, which will communicate with the control panel to determine how much chemicals are needs to treat the water. The control panel is shown as data processing system 210 in FIG. 2 and computing system 110 of FIG. 1. Each filter suction can draw water from either single or multiple outlets located in each respective zone. The aggregate of the water will be sampled in each zone through the use of a chemical controller that will monitor the water quality on a constant basis. As each location includes a chemical controller in communication with a chemical delivery pump that is in fluid communication with a corresponding chemical delivery outlet or outlets in that location, each chemical controller is able to deliver the amount of chemical required to treat that specific location separately from other locations through the chemical delivery pump.

With respect to FIGS. 5 and 8, each module has its own remote water quality sensor, which may communicate with the control panel to monitor the water quality of the respective zones in order to determine how much chemicals are needed to treat the water. There may be a single or multiple remote water quality sensors located in the same zone. The quantity of water treatment chemicals will be decided based on an algorithm to determine the impact factor of each remote water quality sensor located within a single zone. The sensors may be wireless or wired. The sensors may communicate with the chemical controller to determine the water quality of the zone. The control panel will then communicate with the filtration systems to adjust the chemicals and improve water quality in a specific zone. As each location includes a sensor or sensors for monitoring water quality, a chemical controller that may include its own chemical delivery pump that is in fluid communication with the chemical delivery outlets of each of the locations is able to deliver the amount of chemical required to treat that specific location separately from other locations through the chemical delivery pump.

With respect to FIGS. 6 and 9, each module has its water treatment chemicals controlled by the sampling pump chemical controller. For each zone, there may be one or more electrically operated valves in fluid communication with the sampling pump. The system will cycle through each zone to test the water quality and determine how much chemicals to input into their respective filter lines. Depending on the size of the body of water, there can be a single sampling pump and chemical controller module or multiple sampling pump and chemical controller modules. The sampling pump will be able to draw water from each zone individually through the use of automated valves. The water drawn from the zones can either be through a single area or multiple areas of a zone to sample the water quality in the respective zones. The sampling pump will cycle through each zone for a certain amount of time to determine the water quality associated with each individual zone. As each location includes a valve or valves in fluid communication with a sampling pump to monitor the water quality for each location by drawing water through the corresponding valve or valves by the sampling pump for testing, a chemical controller that is in communication with a chemical delivery pump that is in fluid communication with the chemical delivery outlets of each of the locations is able to deliver the amount of chemical required to treat that specific location separately from other locations through the chemical delivery pump.

Thus, as shown in FIGS. 1 through 9, the water quality can be improved in specific zones as opposed to having to treat the entire body of water. There can be multiple reasons for poor water quality in one zone as opposed to the other zones. Reasons include, but are not limited to, a higher amount of bathers, shallower water concentrating the amount of foreign objects or foliage in the area. For that reason, each filtration system will have its own chemical controller adjustment to increase or decrease the cleaning method in each zone on an as-needed basis. Concentrated efforts to improve water quality in certain zones as opposed to treating the entire body of water as one will reduce the need to maintain pumps running at 100% and reduce the amount of chemicals needed to treat the water.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for automated sampling, testing and treating water basins comprising:
    identifying a plurality of locations of a water basin, wherein each location comprises at least one chemical delivery outlet integrated with the water basin;
    monitoring water quality for each of the plurality of locations and mapping a water quality value to each of the locations;
    responsive to the water quality value failing to meet a threshold value in a first location of the plurality of locations, automatically determining an amount of chemical based on the water quality value and discriminately delivering the amount of chemical only to the first location through its corresponding chemical delivery outlet that is integrated with the water basin.

2. The method of claim 1, wherein each location comprises:
    a chemical controller; and
    a chemical delivery pump in communication with the chemical controller, the chemical delivery pump being in fluid communication with its corresponding at least one chemical delivery outlet and each chemical controller only delivers the amount of chemical to its corresponding location through the chemical delivery pump.

3. The method of claim 1, further comprising:
    wherein each location comprises at least one sensor for monitoring water quality;
    wherein a chemical controller is in communication with a chemical delivery pump that is in fluid communication with the chemical delivery outlets of the plurality of locations; and,
    wherein the chemical controller is capable of delivering the amount of chemical to each of the plurality of locations discriminately through the chemical delivery pump.

4. The method of claim 1, further comprising:
    wherein each location comprises at least one valve in fluid communication with a sampling pump and the water quality for each location is monitored by drawing water through its corresponding valve by the sampling pump for testing;
    wherein a chemical controller is in communication with a chemical delivery pump that is in fluid communication with the chemical delivery outlets of the plurality of locations; and,
    wherein the chemical controller is capable of delivering the amount of chemical to each of the plurality of locations discriminately through the chemical delivery pump.

5. The method of claim 1, further comprising:
    monitoring fluid flow within the water basin for each of the plurality of locations through a flow sensor in each of the plurality of locations and wherein each location further comprises at least one inlet fluidly connected to a filter pump and at least one outlet, the at least one inlet and at least one outlet each being integrated with the water basin; and
    responsive to the water quality failing to meet the threshold value in the the first location, discriminately increasing the fluid flow only to the first location through its corresponding filter pump to provide additional filtration to the first location.

6. The method of claim 1, further comprising:
    automatically determining an additional amount of chemical based on the water quality value and further delivering the additional amount of chemical to a second location of the plurality of locations that is adjacent to the first location through the second location's corresponding chemical delivery outlet.

7. A data processing system configured for automated sampling, testing and treating water basins, the system comprising:
- a host computing system comprising one or more computers each with memory and at least one processor;
- an application executing in memory of the host computing system; and,
- an automated sampling, testing and treating larger water basin module coupled to the application, the module comprising program code enabled to store a plurality of locations of a water basin, wherein each location comprises at least one chemical delivery outlet integrated with the water basin, monitor water quality for each of the plurality of locations and mapping a water quality value to each of the locations and respond to the water quality value failing to meet a threshold value in a first location by automatically determining an amount of chemical based on the water quality value and discriminately delivering the amount of chemical only to the first location through its corresponding chemical delivery outlet.

8. The system of claim 7, wherein each location comprises:
- a chemical controller; and
- a chemical delivery pump in communication with the chemical controller, the chemical delivery pump being in fluid communication with its corresponding at least one chemical delivery outlet and each chemical controller only deliver the amount of chemical to its corresponding location through the chemical delivery pump.

9. The system of claim 7, further comprising:
- wherein each location comprises at least one sensor for monitoring water quality;
- wherein a chemical controller is in communication with a chemical delivery pump that is in fluid communication with the chemical delivery outlets of the plurality of locations; and,
- wherein the chemical controller is capable of delivering the amount of chemical to each of the plurality of locations discriminately through the chemical delivery pump.

10. The system of claim 7, further comprising:
- wherein each location comprises at least one valve in fluid communication with a sampling pump and the water quality for each location is monitored by drawing water through its corresponding valve by the sampling pump for testing;
- wherein a chemical controller is in communication with a chemical delivery pump that is in fluid communication with the chemical delivery outlets of the plurality of locations; and,
- wherein the chemical controller is capable of delivering the amount of chemical to each of the plurality of locations discriminately through the chemical delivery pump.

11. The system of claim 7, wherein:
- the module further comprises program code enabled to:
  - monitor fluid flow within the water basin for each of the plurality of locations through a flow sensor in each of the plurality of locations, each location further comprising at least one inlet connected hydraulically to a filter pump between the inlet and outlet a plurality of outlets, the at least one inlet and the plurality of outlets each being integrated with the water basin; and
  - respond to the water quality failing to meet the threshold value in the first location by increasing the fluid flow only to the first location through its corresponding filter pump to provide additional filtration to the first location.

12. The system of claim 7, wherein the module further comprises program code enabled to automatically determine an additional amount of chemical based on the water quality value and further deliver the additional amount of chemical to at least one other second location of the plurality of locations adjacent to the first location through the corresponding chemical delivery outlet of the at least one other second location.

13. A computer program product for automated sampling, testing and treating water basins, the computer program product comprising a non-transitory computer readable storage medium having program instructions embodied therewith, the program instructions executable by a device to cause the device to perform a method comprising:
- storing a plurality of locations of a water basin, wherein each location comprises at least one chemical delivery outlet integrated with the water basin;
- monitoring water quality for each of the plurality of locations and mapping a water quality value to each of the locations;
- responsive to the water quality value failing to meet a threshold value in a first location, automatically determining an amount of chemical based on the water quality value and discriminately delivering the amount of chemical only to the first location through its corresponding chemical delivery outlet.

14. The computer program product of claim 13, wherein each location comprises:
- a chemical controller; and
- a chemical delivery pump in communication with the chemical controller, the chemical delivery pump being in fluid communication with its corresponding at least one chemical delivery outlet and each chemical controller only delivers the amount of chemical to its corresponding location through the chemical delivery pump.

15. The computer program product of claim 13, the method further comprising:
- wherein each location comprises at least one sensor for monitoring water quality;
- wherein a chemical controller is in communication with a chemical delivery pump that is in fluid communication with the chemical delivery outlets of the plurality of locations; and,
- wherein the chemical controller is capable of delivering the amount of chemical to each of the plurality of locations discriminately through the chemical delivery pump.

16. The computer program product of claim 13, the method further comprising:
- wherein each location comprises at least one valve in fluid communication with a sampling pump and the water quality for each location is monitored by drawing water through its corresponding valve by the sampling pump for testing;
- wherein a chemical controller is in communication with a chemical delivery pump that is in fluid communication with the chemical delivery outlets of the plurality of locations; and, wherein the chemical controller is capable of delivering the amount of chemical to each of the plurality of locations discriminately through the chemical delivery pump.

17. The computer program product of claim 13, the method further comprising:
monitoring fluid flow within the water basin for each of the plurality of locations through a flow sensor in each of the plurality of locations and wherein each location further comprises at least one inlet hydraulically connected to a filter pump between the inlet and a plurality of outlets, the at least one inlet and the plurality of outlets each being integrated with the water basin; and
responsive to the water quality failing to meet the threshold value in the first location, discriminately increasing the fluid flow only to the first location through its corresponding filter pump to provide additional filtration to the first location.

18. The computer program product of claim 13, the method further comprising:
automatically determining an additional amount of chemical based on the water quality value and further delivering the additional amount of chemical to at least one other second location of the plurality of locations adjacent to the first location through the corresponding chemical delivery outlet of the at least one other second location.

19. The system of claim 7, wherein the plurality of locations are hydraulically connected and independently controlled.

20. The system of claim 7, wherein the monitored water quality for each the plurality of locations includes at least one of turbidity, hardness, chlorine, alkalinity, and total dissolved solids.

* * * * *